United States Patent
Prasso et al.

(10) Patent No.: US 11,935,286 B2
(45) Date of Patent: Mar. 19, 2024

(54) METHOD AND DEVICE FOR DETECTING A VERTICAL PLANAR SURFACE

(71) Applicant: GOOGLE LLC, Mountain View, CA (US)

(72) Inventors: Luca Prasso, Mountain View, CA (US); Seth Raphael, Portland, OR (US)

(73) Assignee: GOOGLE LLC, Mountain View, CA (US)

( * ) Notice: Subject to any disclaimer, the term of this patent is extended or adjusted under 35 U.S.C. 154(b) by 479 days.

(21) Appl. No.: 17/278,935

(22) PCT Filed: Oct. 1, 2019

(86) PCT No.: PCT/US2019/054033
§ 371 (c)(1),
(2) Date: Mar. 23, 2021

(87) PCT Pub. No.: WO2020/072472
PCT Pub. Date: Apr. 9, 2020

(65) Prior Publication Data
US 2022/0051018 A1 Feb. 17, 2022

Related U.S. Application Data

(60) Provisional application No. 62/739,636, filed on Oct. 1, 2018.

(51) Int. Cl.
*G06V 20/10* (2022.01)
*G06V 10/40* (2022.01)

(52) U.S. Cl.
CPC .............. *G06V 20/10* (2022.01); *G06V 10/40* (2022.01)

(58) Field of Classification Search
USPC ......................................................... 382/103
See application file for complete search history.

(56) References Cited

U.S. PATENT DOCUMENTS

| 10,585,278 B2 * | 3/2020 | Ng-Thow-Hing | .... G06F 3/0481 |
| 2014/0240464 A1 | 8/2014 | Lee | |
| 2015/0228114 A1 * | 8/2015 | Shapira | ................... G06T 15/08 345/421 |

(Continued)

OTHER PUBLICATIONS

Indian Office Action dated Feb. 3, 2022 for corresponding IN Application No. 202147013455, 6 pages.

(Continued)

*Primary Examiner* — Ishrat I Sherali

(57) ABSTRACT

A method of vertical planar surface detection includes identifying, at an electronic device, a plurality of feature points of an environment proximate the electronic device based on imagery captured at the electronic device and based on received non-visual pose information obtained from non-visual sensors. The electronic device queries the plurality of feature points to identify one or more planar surfaces in the imagery captured at the electronic device. Further, the electronic device computes a plurality of oriented point vectors associated with the one or more planar surfaces. A vertical planar surface is detected based at least in part on one or more of the plurality of oriented point vectors being aligned in a direction perpendicular to gravity within a predetermined threshold.

18 Claims, 6 Drawing Sheets

(56) References Cited

U.S. PATENT DOCUMENTS

2018/0095276 A1\* 4/2018 Ng-Thow-Hing ...... G06F 3/016
2023/0093087 A1\* 3/2023 Babinowich ......... G06V 10/774
                                                                                                                                                       345/423

OTHER PUBLICATIONS

Communication Pursuant to Article 94(3) EPC dated Apr. 24, 2023 for EP Application No. 19795378.9, 5 pages.
International Preliminary Report on Patentability dated Apr. 15, 2021 for International Application No. PCT/US2019/054033, 8 pages.
International Search Report and Written Opinion mailed Feb. 20, 2020 for International Application No. PCT/US2019/054033, 15 pages.
Zhang, Yizhong, et al., "Online Structure Analysis for Real-Time Indoor Scene Reconstruction", ACM Transactions on Graphics, vol. 34, No. 5, Article 159, Oct. 2015, 13 pages.
Angladon, Vincent, et al., "Room Floor Plan Generation on a Project Tango Device", Springer International Publishing AG 2018, Schoeffmann K. et al. (eds) MultiMedia Modeling, MMM 2018, Lecture Notes in Computer Science, vol. 10705, Jan. 2018, 13 pages.
Staats, Bart, et al., "Identification of Walkable Space Using a Point Cloud and its Trajectory", Delft University of Tecnology, 2016, 16 pages.
Dzitsiuk, Maksym, et al., De-noising, Stabilizing, and Completing 3D Reconstructions On-The-Go Using Plane Priors, IEEE International Conference on Robotics and Automation (ICRA), May 2017, 8 pages.
International Search Report and Written Opinion dated Feb. 20, 2020 for corresponding International Application No. PCT/US2019/054033, 15 pages.
De-Noising, Stabilizing and Completing 3D Reconstructions On-the-go using Plane Priors, Dzitsiuk1 et al., 2017 IEEE International Conference on Robotics and Automation (ICRA) Singapore, May 29-Jun. 3, 2017, 8 pages.
Identification of Walkalbe Space Using a Point of Cloud and Its Trajectory, Staats, Delft University of Technology, Master of Science in Geomatics for Built Environment Jan. 13, 2018, 16 pages.
Online Structure Analysis for Real-Time Indoor Scene Reconstruction, Zhang et al., ACM Trans. Graph. 34, 5, Article 159 Jan. 13, 2018, 13 pages.
Room Floor Plan Generation on a Project Tango Device, Vincent et al., International Conference on Financial Cryptography and Data Security Jan. 13, 2018, 13 pages.

\* cited by examiner

METHOD AND DEVICE FOR DETECTING A VERTICAL PLANAR SURFACE

This application is a U.S. National Stage application under 35 U.S.C. § 371 of International Patent Application Serial No. PCT/US2019/054033, entitled "METHOD AND DEVICE FOR DETECTING A VERTICAL PLANAR SURFACE," and filed on Oct. 1, 2019, which claims priority to U.S. Provisional Patent Application No. 62/739,636, filed on Oct. 1, 2018 and entitled, "ORIENTED POINTS FOR GENERATING A FLOOR PLAN," each of which is incorporated herein by reference in its entirety.

BACKGROUND

Implementation of machine vision at a device can support a variety of applications enables simultaneous localization and mapping (SLAM), which in turn can support a variety of applications, such as augmented reality (AR) applications and virtual reality (VR) applications, by enabling identification of objects within the local environment of a device through the analysis of imagery of the local environment captured by the device and through correlating pose information for the mobile device with the identified objects. To support these features, the mobile device can collect a wide variety of data, including by capturing imagery at one or more image sensors and by receiving data from a variety of non-visual sensors (e.g., accelerometers and gyroscopes).

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

DETAILED DESCRIPTION OF EMBODIMENTS

The following description is intended to convey a thorough understanding of the present disclosure by providing a number of specific embodiments and details involving the identification of wall surfaces proximate to an electronic device based on image-based identification of objects in a local environment of the electronic device. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-6 illustrate various techniques for detecting vertical planar surfaces (e.g., for identification of wall surfaces) at an electronic device based on characteristics of features identified in captured imagery. The electronic devices queries a plurality of visually distinct features in captured imagery (e.g., commonly referred to as "feature points") by performing hit testing (also known as raycasting) to resolve whether a ray along the normal from a screen of the electronic device returns a planar surface. That is, hit testing projects a ray into the electronic device's view (via one or more image sensors) of the local environment and returns feature points that the ray intersects, along with the pose of that intersection in world space, to determine whether a perceived plane passes through the feature points at the intersection of the ray. Based on detection of a plane, the electronic device computes an oriented point vector representing a vector normal to the detected plane. The electronic device determines whether the oriented point vector is facing the electronic device and whether the oriented point is perpendicular to gravity for vertical planar surface recognition. The electronic device thereby detects presence of walls in the local environment.

Figure 1:
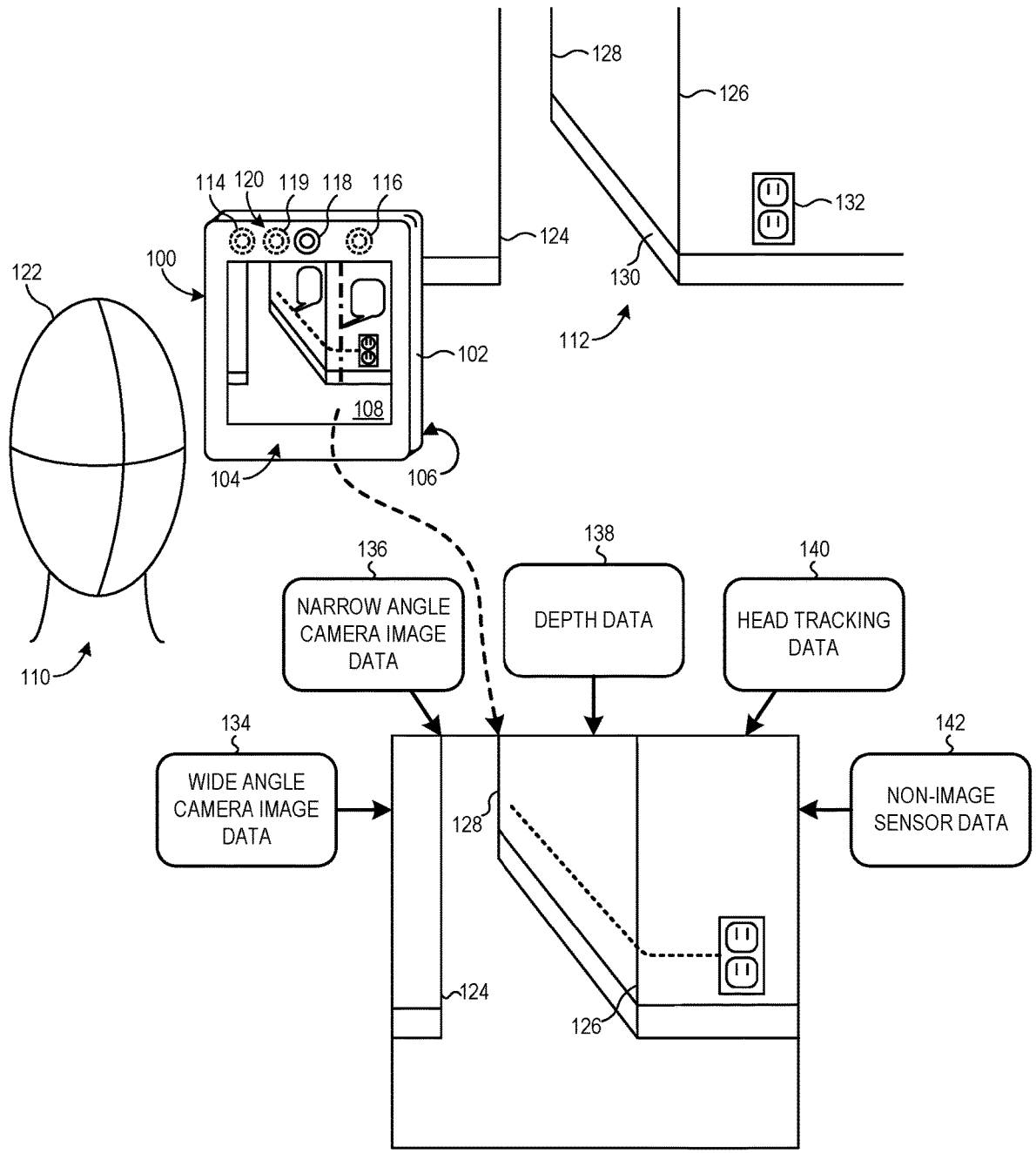
FIG. 1 is a diagram illustrating an electronic device configured detect vertical planar surfaces based on characteristics of features identified from captured image data in accordance with at least one embodiment of the present disclosure.

FIG. 1 illustrates an electronic device 100 configured to support location-based functionality, such as SLAM, VR, or AR, using image and non-visual sensor data in accordance with at least one embodiment of the present disclosure. The electronic device 100 can include a user-portable mobile device, such as a tablet computer, computing-enabled cellular phone (e.g., a "smartphone"), a notebook computer, a personal digital assistant (PDA), a gaming system remote, a television remote, and the like. In other embodiments, the electronic device 100 can include another type of mobile device, such as an automobile, remote-controlled drone or other airborne device, and the like. For ease of illustration, the electronic device 100 is generally described herein in the example context of a mobile device, such as a tablet computer or a smartphone; however, the electronic device 100 is not limited to these example implementations.

In the depicted example, the electronic device 100 includes a housing 102 having a surface 104 opposite another surface 106. In the example thin rectangular block form-factor depicted, the surfaces 104 and 106 are substantially parallel and the housing 102 further includes four side surfaces (top, bottom, left, and right) between the surface 104 and surface 106. The housing 102 may be implemented in many other form factors, and the surfaces 104 and 106 may have a non-parallel orientation. For the illustrated tablet implementation, the electronic device 100 includes a display 108 disposed at the surface 104 for presenting visual information to a user 110. Accordingly, for ease of reference, the surface 106 is referred to herein as the "forward-facing" surface and the surface 104 is referred to herein as the "user-facing" surface as a reflection of this example orientation of the electronic device 100 relative to the user 110, although the orientation of these surfaces is not limited by these relational designations.

The electronic device 100 includes a plurality of sensors to obtain information regarding a local environment 112 of the electronic device 100. The electronic device 100 obtains visual information (imagery) for the local environment 112 via imaging sensors 114 and 116 and a depth sensor 120 disposed at the forward-facing surface 106 and an imaging sensor 118 disposed at the user-facing surface 104. In one embodiment, the imaging sensor 114 is implemented as a wide-angle imaging sensor having a fish-eye lens or other wide-angle lens to provide a wider angle view of the local environment 112 facing the surface 106. The imaging sensor 116 is implemented as a narrow-angle imaging sensor having a typical angle of view lens to provide a narrower angle view of the local environment 112 facing the surface 106. Accordingly, the imaging sensor 114 and the imaging sensor 116 are also referred to herein as the "wide-angle imaging sensor 114" and the "narrow-angle imaging sensor 116," respectively. As described in greater detail below, the wide-angle imaging sensor 114 and the narrow-angle imaging sensor 116 can be positioned and oriented on the forward-facing surface 106 such that their fields of view overlap starting at a specified distance from the electronic device 100, thereby enabling depth sensing of objects in the local environment 112 that are positioned in the region of overlapping fields of view via image analysis. The imaging sensor 118 can be used to capture image data for the local environment 112 facing the surface 104. Further, in some embodiments, the imaging sensor 118 is configured for tracking the movements of the head 122 or for facial recognition, and thus providing head tracking information that may be used to adjust a view perspective of imagery presented via the display 108.

The depth sensor 120, in one embodiment, uses a modulated light projector 119 to project modulated light patterns from the forward-facing surface 106 into the local environment, and uses one or both of imaging sensors 114 and 116 to capture reflections of the modulated light patterns as they reflect back from objects in the local environment 112. These modulated light patterns can be either spatially-modulated light patterns or temporally-modulated light patterns. The captured reflections of the modulated light patterns are referred to herein as "depth imagery." The depth sensor 120 then may calculate the depths of the objects, that is, the distances of the objects from the electronic device 100, based on the analysis of the depth imagery. The resulting depth data obtained from the depth sensor 120 may be used to calibrate or otherwise augment depth information obtained from image analysis (e.g., stereoscopic analysis) of the image data captured by the imaging sensors 114 and 116. Alternatively, the depth data from the depth sensor 120 may be used in place of depth information obtained from image analysis. To illustrate, multiview analysis typically is more suited for bright lighting conditions and when the objects are relatively distant, whereas modulated light-based depth sensing is better suited for lower light conditions or when the observed objects are relatively close (e.g., within 4-5 meters). Thus, when the electronic device 100 senses that it is outdoors or otherwise in relatively good lighting conditions, the electronic device 100 may elect to use multiview analysis to determine object depths. Conversely, when the electronic device 100 senses that it is indoors or otherwise in relatively poor lighting conditions, the electronic device 100 may switch to using modulated light-based depth sensing via the depth sensor 120.

The electronic device 100 also may rely on non-visual pose information for pose detection. This non-visual pose information can be obtained by the electronic device 100 via one or more non-visual sensors (not shown in FIG. 1), such as an inertial measurement unit (IMU) including one or more gyroscopes, magnetometers, and accelerometers (e.g., for measuring the acceleration effect of Earth's gravity on the electronic device 100 enclosing the accelerometer and determining a gravity direction). In at least one embodiment, the IMU can be employed to generate pose information along multiple axes of motion, including translational axes, expressed as X, Y, and Z axes of a frame of reference for the electronic device 100, and rotational axes, expressed as roll, pitch, and yaw axes of the frame of reference for the electronic device 100. The non-visual sensors can also include ambient light sensors and location sensors, such as GPS sensors, or other sensors that can be used to identify a location of the electronic device 100, such as one or more wireless radios, cellular radios, and the like.

In operation, the electronic device 100 uses the image sensor data and the non-visual sensor data to estimate a pose of the electronic device 100. In at least one embodiment, after a reset the electronic device 100 determines an initial pose based on geolocation data, other non-visual sensor data, visual sensor data as described further below, or a combination thereof. As the pose of the electronic device 100 changes, the non-visual sensors generate, at a relatively high rate, non-visual pose information reflecting the changes in the device pose. Concurrently, the visual sensors capture images that also reflect device pose changes. Based on this non-visual and visual pose information, the electronic device 100 updates the initial pose to reflect a current pose of the device.

The electronic device 100 generates visual pose information based on the detection of spatial features in image data captured by one or more of the imaging sensors 114, 116, and 118. To illustrate, in the depicted example of FIG. 1 the local environment 112 includes a hallway of an office building that includes three corners 124, 126, and 128, a baseboard 130, and an electrical outlet 132. The user 110 has positioned and oriented the electronic device 100 so that the forward-facing imaging sensors 114 and 116 capture wide angle imaging sensor image data 134 and narrow angle imaging sensor image data 136, respectively, that includes these spatial features of the hallway. In this example, the depth sensor 120 also captures depth data 138 that reflects the relative distances of these spatial features relative to the current pose of the electronic device 100. Further, the user-facing imaging sensor 118 captures image data representing head tracking data 140 for the current pose of the head 122 of the user 110. Non-visual sensor data 142, such as readings from the IMU, also is collected by the electronic device 100 in its current pose.

From this input data, the electronic device 100 can determine an estimate of its relative pose without explicit absolute localization information from an external source. To illustrate, the electronic device 100 can perform analysis of the wide angle imaging sensor image data 134 and the narrow angle imaging sensor image data 136 to determine the distances between the electronic device 100 and the corners 124, 126, 128. Alternatively, the depth data 138 obtained from the depth sensor 120 can be used to determine the distances of the spatial features. From these distances the electronic device 100 can triangulate or otherwise infer its relative position in the office represented by the local environment 112. As another example, the electronic device 100 can identify spatial features present in one set of captured images of the image data 134 and 136, determine the initial distances to these spatial features, and then track the changes in position and distances of these spatial features in subsequent captured imagery to determine the change in pose of the electronic device 100 in a free frame of reference. In this approach, certain non-visual sensor data, such as gyroscopic data or accelerometer data, can be used to correlate spatial features observed in one image with spatial features observed in a subsequent image.

In at least one embodiment, the electronic device 100 uses the image data and the non-visual data to detect vertical planar surfaces (e.g., for identification of wall surfaces) based on characteristics of features identified in captured imagery (e.g., wide angle imaging sensor image data 134 and narrow angle imaging sensor image data 136). The terms "planar surface(s)" and "plane(s)" are herein used interchangeably. The electronic devices 100 queries a plurality of visually distinct spatial features in captured imagery (e.g., commonly referred to as "feature points" or "interest points") by performing hit testing (also known as raycasting) to resolve whether a ray along the normal from the display 108 of the electronic device 100 returns a planar surface. That is, hit testing projects a ray into the electronic device's view (via one or more image sensors) of the local environment 112 and returns features points that the ray intersects, along with the pose of that ray intersection in world space, to determine whether a perceived plane passes through the feature points at the intersection of the ray.

As used herein, the term "feature point" or "feature points" refers to at least one identifiable point or feature, and therefore includes a point in an image having a well-defined position which can be detected. For example, in various embodiments, a feature point includes at least one of a corner, a line, an edge, a point, and the like but may also include an isolated point of local intensity maximum or minimum, line endings, or a point on a curve where the curvature is locally maximal. In various embodiments, a feature point includes a point in an image which in general can be characterized by one or more of the following: (i) the point has a clear, preferably mathematically well-founded, definition; (ii) the point has a well-defined position in image space; (iii) the local image structure around the feature point is rich in terms of local information contents, such that the use of feature points simplify further processing in the vision system; and (iv) the point is stable under local and global perturbations in the image domain, including deformations as those arising from perspective transformations (sometimes reduced to affine transformations, scale changes, rotations, and/or translations) as well as illumination/brightness variations, such that the feature points can be reliably computed with high degree of reproducibility. Feature points may be generated by objects in the local environment 112, for example, in response to an illumination by the modulated light projector 119 or other light sources of the electronic device 100.

In various embodiments, the electronic device 100 generates feature descriptors for the spatial features/feature points in the captured imagery. Each of the generated feature descriptors describes the orientation, gravity direction, scale, and other aspects of one or more of the identified spatial features/feature points. Further, in various embodiments, each of the feature descriptors includes one or more fields identifying the pose (e.g., the orientation or point of view) of the corresponding spatial feature. Thus, a feature descriptor can include pose information indicating the location of the spatial feature within a specified coordinate system (e.g. a geographic coordinate system representing Earth) within a specified resolution (e.g. 1 cm), the orientation of the point of view of the spatial feature, the distance of the point of view from the feature and the like. The feature descriptors can be stored at the electronic device 100, at a remote server or other storage device, or a combination thereof. Accordingly, the comparison of the generated feature descriptors can be performed at the electronic device 100, at the remote server or other device, or a combination thereof.

In some embodiments, the electronic device 100 computes, based on detection of a plane, an oriented point vector representing a vector normal to the detected plane. As used herein, the term "oriented point" refers a feature point or other three-dimensional (3D) point in space and its associated surface normal/direction. For example, in various embodiments, objects in the local environment 112 may be represented as a polygonal surface mesh including a plurality of 3D points on the surface of the objects. An oriented point may be defined as on a surface mesh of the object using vertex position p and surface normal n (e.g., defined as the normal of the best fit plane to the point and its neighbors in the surface mesh oriented to the outside of the object). In three dimensions, the surface normal to a surface at a vertex position/point p is a vector that is perpendicular to the tangent plane to that surface at point p (also interchangeably referred to herein as the "oriented point vector").

The electronic device 100 determines whether the oriented point vector is facing the electronic device 100 and whether a direction of the oriented point vector is perpendicular to gravity for vertical planar surface recognition. The electronic device 100 compares the oriented point vector to visual pose data of the electronic device 100. For example, oriented point vectors directed away from the electronic device 100 are discarded. Additionally, the electronic device 100 compares the oriented point vector to non-visual pose data. For example, based on non-visual sensor data 142 from the IMU, the electronic device 100 discards oriented point vectors that are not substantially perpendicular (within a pre-determined threshold or margin) to gravity, as such vectors may each represent different points in a common planar surface (e.g., a tabletop) but are not representative of a vertical planar surface. By discarding any vectors that are not substantially perpendicular to gravity, the electronic device removes false positives when the electronic device 100 is oriented to be pointed to, for example, a ceiling or a floor of the local environment 112 that are planar surfaces but are not vertically-oriented such as to be a wall. Accordingly, the electronic device 100 detects the presence of walls (e.g., a vertical planar surface aligned in the direction perpendicular to gravity) or other vertical surfaces in the local environment 112 only in response to the oriented point vector facing the electronic device 100 and also the oriented point vector being substantially perpendicular to gravity.

The electronic device 100 stores detected vertical planar surface together with non-visual pose data as localization data that can be used both to identify a pose of the electronic device 100 and to map a local environment for the electronic device 100. For example, the electronic device 100 can use the localization data and the vertical planar surface data to generate a floor plan that indicates the positions of walls in the local environment 112. The floor plan can be used to support any of a variety of location-based services. For example, in one embodiment, the floor plan can be used to generate an augmented reality or a virtual reality environment, or portion thereof, representing the local environment of the electronic device 100.

Figure 2:
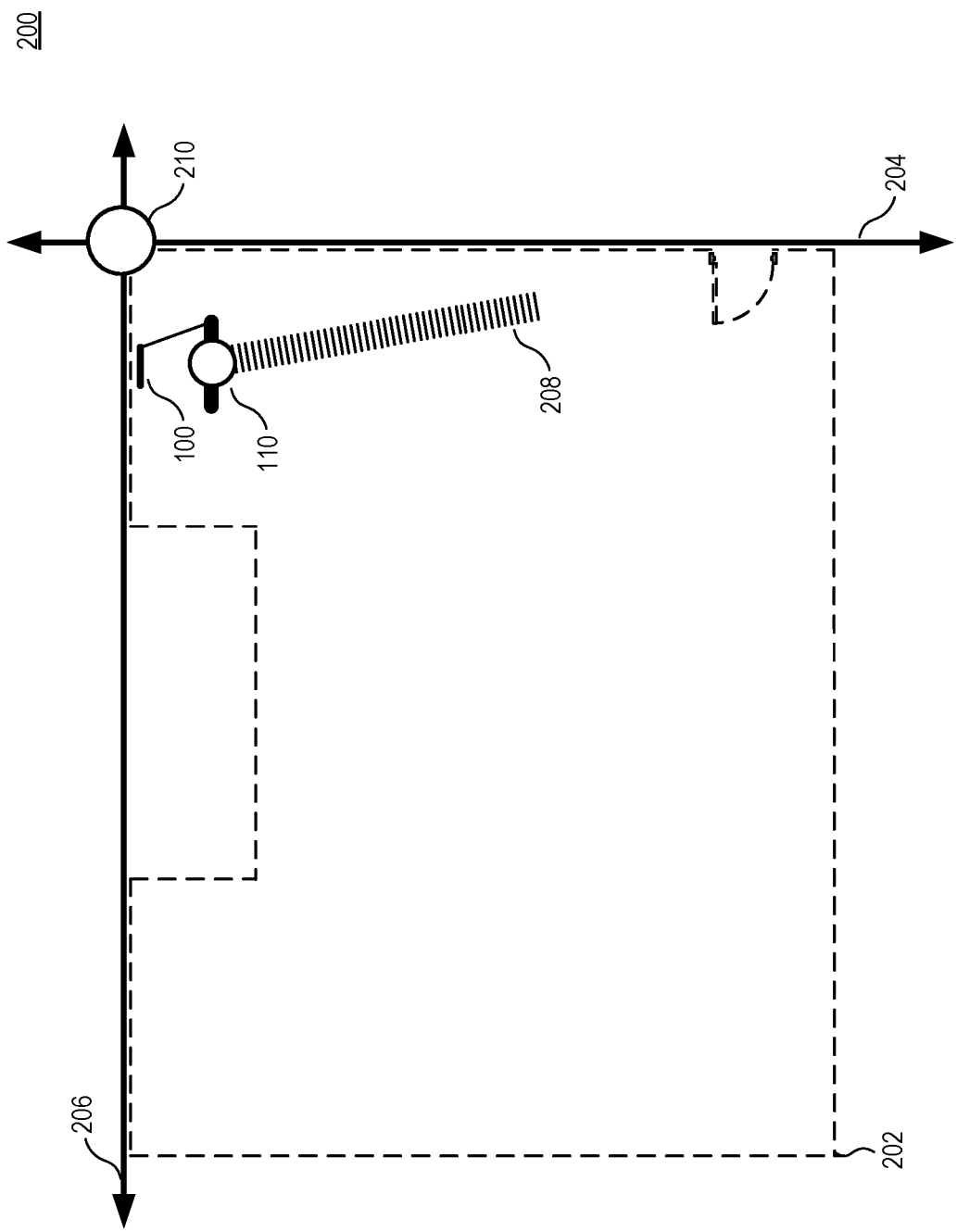
FIG. 2 is a diagram illustrating wall detection based on characteristics of features identified from captured imagery in accordance with at least one embodiment of the present disclosure.

FIG. 2 is a top-down diagram illustrating wall detection based on characteristics of features identified from captured imagery in accordance with at least one embodiment of the present disclosure. As shown in diagram 200, the user 110 is positioned within an unmapped room 202 as represented by the dotted lines. As shown, the user 100 has identified a first wall boundary 204. In some embodiments, the user identification of the first wall boundary 204 includes detection of a vertical planar surface (as described in more detail above relative to FIG. 1) when the electronic device 100 is pointed towards a wall. The electronic device 100 detects such vertical surfaces based on, for example, any distinguishable features of the wall including but not limited to light switches, paintings, curtains, TV, wall textures, and the like. In various embodiments, the electronic device 100 displays a user prompt (not shown) to the user 110 notifying the presence of a detected vertical planar surface. In response to the user prompt, the user 110 confirms that the detected vertical planar surface is indeed a wall and should be added to the floor plan. The first wall boundary 204 is initially represented as an infinite plane as the electronic device 100 is unaware of the metes and bounds of the first wall boundary relative to the unmapped room 202. Although described here in the context of a manual process by which the user 110 confirms that a detected vertical planar surface represents a wall boundary, those skilled in the art will recognize that in various other embodiments the electronic device 100 is capable of identifying and validating whether detected vertical planar surfaces are walls using, for example, artificial intelligence and machine learning to recognize walls without manual human intervention. In those embodiments, the user 110 generates a floor plan (or other mapping of the local environment) by walking and positioning the electronic device 100 to capture imagery of the local environment (in a manner similar to that described with respect to FIG. 2 but without manual, user confirmation of the presence of walls).

Subsequently, as shown in diagram 200, the user 100 has identified second wall boundary 206 after traversing the unmapped room 202 along user path 208. In some embodiments, the user identification of the second wall boundary 206 includes detection of a vertical planar surface (as described in more detail above relative to FIG. 1) when the electronic device 100 is pointed towards a wall. The electronic device 100 detects such vertical surfaces based on, for example, any distinguishable features of the wall including but not limited to light switches, paintings, curtains, TV, wall textures, and the like. In response to a user prompt (not shown) displayed to the user 100 notifying the presence of a vertical planar surface, the user 110 confirms that the detected vertical planar surface is indeed a wall and should be added to the floor plan. The second wall boundary 206 is initially represented as an infinite plane as the electronic device 100 is unaware of the metes and bounds of the second wall boundary 206 relative to the unmapped room 202. Subsequently, the electronic device 100 identifies a corner 210 of the room based on the intersection of the infinite planes of the first wall boundary 204 and the second wall boundary 206.

Figure 3:
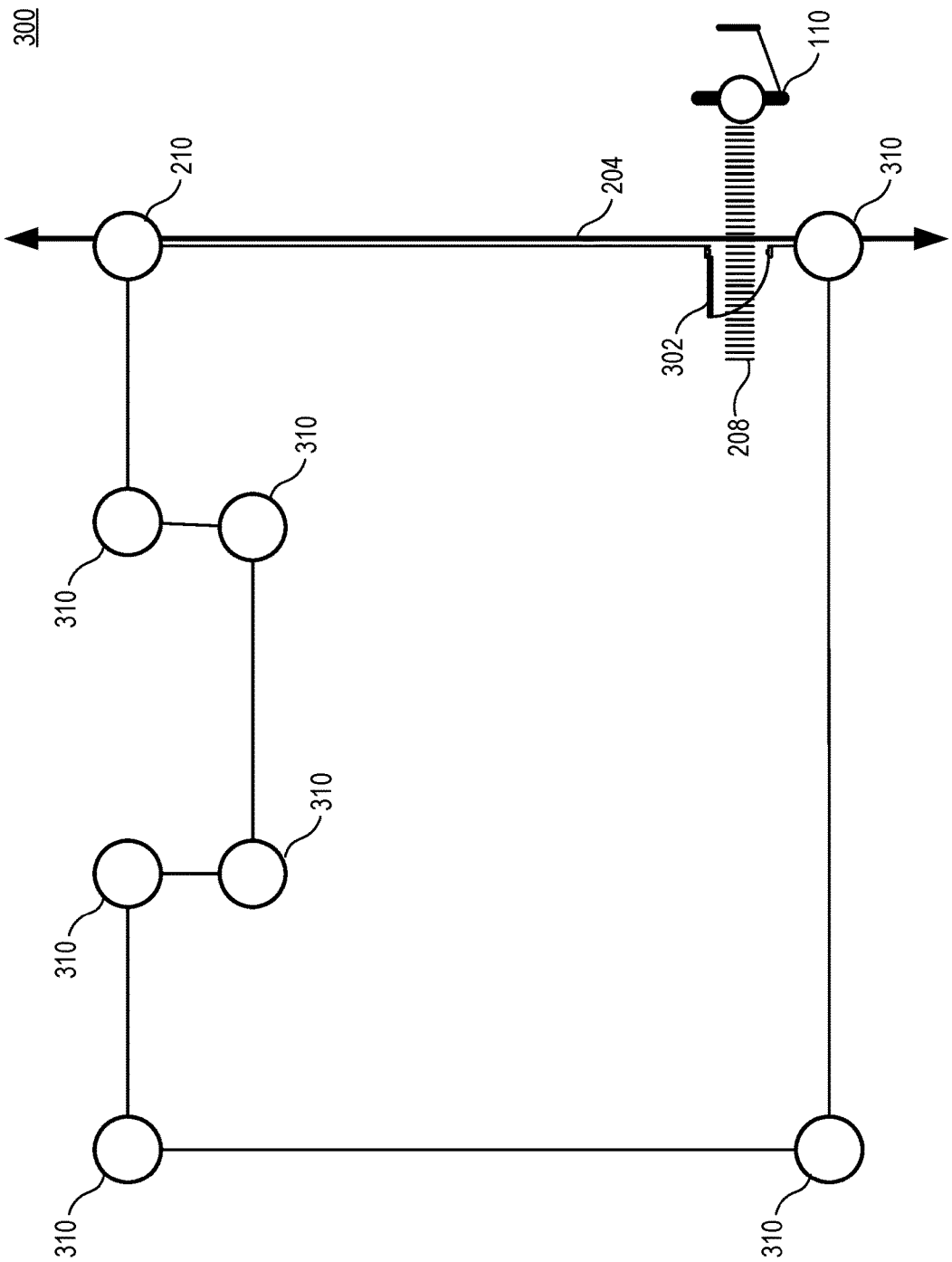
FIG. 3 is a diagram illustrating floor plan generation based on characteristics of features identified from captured imagery in accordance with at least one embodiment of the present disclosure.

Referring now to FIG. 3, illustrated is a top-down diagram of floor plan generation based on characteristics of features identified from captured imagery in accordance with at least one embodiment of the present disclosure. As shown, the user 110 has iteratively repeated the operations as described in FIG. 2 to identify a plurality of wall boundaries. The electronic device 100 has also iteratively detected a plurality of corners 310 based on intersections of the infinite planes of the user-identified wall boundaries to generate a floor plan 300 of the room 202. Further, based on non-visual pose data such as localization data, the electronic device 100 detects that the path 208 of the user 110 has crossed a previously defined wall boundary (i.e., the first wall boundary 204).

Based on the path 208 of the user 110 crossing the first wall boundary 204, the electronic device 100 detects the presence of a doorway 302 (or other opening).

Additionally, in other embodiments, the electronic device 100 utilizes computer vision to extract further information about the floor plan 300 from captured imagery. In various embodiments, objects identified in captured imagery during detection of vertical planar surfaces may be used to provide additional context or feature description of the room 200. For example, in some embodiments, imagery of furniture including a bed and a night stand may be identified during planar surface detection and such information is used to label the floor plan 300 as a bedroom. In other embodiments, features identified on the walls during planar surface detection may be added to the floor plan 300. For example, windows identified during feature detection may be added to provide floor plan 300 with more detail.

Figure 4:
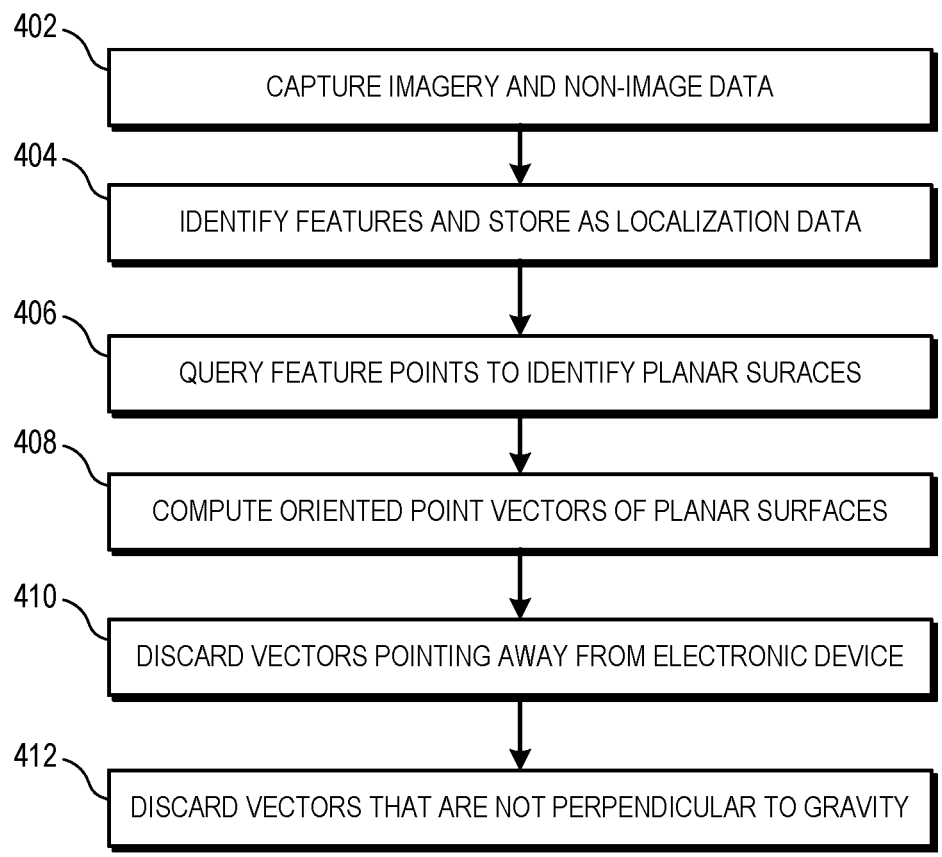
FIG. 4 is a flow diagram of a method of detecting vertical planar surfaces at the electronic device of FIG. 1 in accordance with at least one embodiment of the present disclosure.

FIG. 4 illustrates a flow diagram of a method 400 of detecting vertical planar surfaces at the electronic device 100 in accordance with at least one embodiment of the present disclosure. The method 400 initiates at block 402, where the electronic device 100 captures imagery and non-visual data as it is moved by a user through different poses in a local environment. In various embodiments, and with reference to FIGS. 2 and 6, one or more of the wide-angle imaging sensor 114, the narrow-angle imaging sensor 116, and the user-facing imaging sensor 118 capture imagery (e.g., RGB camera images) of the local environment 112 proximate the electronic device 100. Additionally, the electronic device 100 also captures non-visual pose information. In various embodiments, an inertial measurement unit (IMU) including one or more gyroscopes, magnetometers, and accelerometers (e.g., for measuring the acceleration effect of Earth's gravity on the electronic device 100) captures gravity data and determines a gravity direction. Further, in some embodiments, a Global Positioning System (GPS) receiver of the electronic device captures GPS data corresponding to electronic device 100 non-visual pose information.

At block 404, the electronic device 100 identifies features of the local environment based on the captured imagery and non-visual data, and stores feature descriptors for the identified features. In various embodiments, the electronic device 100 generates feature descriptors for the spatial features/feature points corresponding to one or more identifiable points or features in the captured imagery of block 402. Each of the generated feature descriptors describes the orientation, gravity direction, scale, and other aspects of one or more of the identified spatial features/feature points. Further, in various embodiments, each of the feature descriptors includes one or more fields identifying the pose (e.g., the orientation or point of view) of the corresponding spatial feature. Thus, a feature descriptor can include pose information indicating the location of the spatial feature within a specified coordinate system (e.g. a geographic coordinate system representing Earth) within a specified resolution (e.g. 1 cm), the orientation of the point of view of the spatial feature, the distance of the point of view from the feature and the like. In some embodiments, feature points are generated by objects in the local environment 112 in response to an illumination by the modulated light projector 119 or other light sources of the electronic device 100.

At block 406, the electronic device 100 queries a plurality of visually distinct spatial features (e.g., the feature points described herein) in the captured image data to determine whether a ray along the normal from the display 108 of the electronic device 100 returns a planar surface. In various embodiments, hit testing projects a ray into the electronic device's view (via one or more image sensors) of the local environment 112 and returns features points that the ray intersects, along with the pose of that ray intersection in world space, to determine whether a perceived plane passes through the feature points at the intersection of the ray. In some embodiments, the operations of block 406 includes hit testing by projecting a number of rays into a point cloud of feature points to resolve whether a ray along the normal from the display 108 of the electronic device 100 returns a planar surface. In this manner, the electronic device 100 identifies planar surfaces in the captured visual data of the local environment 112. Those skilled in the art will recognize that the operations of block 406 may be performed a plurality of instances to detect multiple planar surfaces.

At block 408, based on the detection of one or more planar surfaces, the electronic device 100 computes oriented point vectors representing vectors normal to the surface(s) of the feature points on the detected planar surfaces. In some embodiments, the electronic device 100 computes, based on detection of a planar surface at block 406, an oriented point vector representing a vector normal to the detected plane. For example, in various embodiments, objects in the local environment 112 may be represented as a polygonal surface mesh including a plurality of 3D points on the surface of the objects. The electronic device 100 computes an oriented point vector as a surface normal n on a surface mesh of an object using vertex position p. In three dimensions, the surface normal to a surface at a vertex position is a vector that is perpendicular to the tangent plane to that surface at point p (i.e., the oriented point vector). Subsequently, the electronic device 100 determines whether the oriented point vector(s) is facing the electronic device 100 and whether a direction of the oriented point vector is perpendicular to gravity for vertical planar surface recognition.

At block 410, the electronic device 100 compares the oriented point vector to visual pose data of the electronic device 100 and discards oriented point vectors directed away from the electronic device 100. As discussed above, the oriented point vector(s) represents a vector (e.g., which is associated with a direction) normal to the detected planar surface. The oriented point vector should be directed towards the electronic device 100 for vertical planar surface purposes (as opposed to being directed, for example, up and away towards a ceiling of a room). Accordingly, the electronic device 100 compares oriented point vectors to visual pose data of the electronic device 100 and discards a first subset of the oriented point vectors that are directed away from the electronic device 100. In various embodiments, the electronic device 100 discards oriented point vectors not directed towards the electronic device 100 within a first predetermined threshold.

As an example, a first oriented point vector is orthogonal to the forward-facing surface 106 of the electronic device 100 such that it has an angle of intersection of 90 degrees with the electronic device 100. This alignment represents the planar surface at that point p corresponding to the first oriented point vector being directed towards and parallel relative to the forward-facing surface 106. In one embodiment, the predetermined threshold includes an angular deviation of ±5 degrees permitted such that any oriented point vector forming an angle of intersection between the range of 85-95 degrees relative to the forward-facing surface 106 is determined to be sufficiently aligned and directed towards the electronic device. However, the electronic device 100 discards oriented point vectors falling outside that range. Those skilled in the art will recognize that the above described embodiment is provided only for example purposes and that various thresholds or angular deviations may be utilized without departing from the scope of this disclosure.

Additionally, at block 412, the electronic device 100 compares oriented point vectors to non-visual pose data and discards oriented point vectors that are not perpendicular to gravity, as such vectors may each represent different points in a common planar surface (e.g., a tabletop) but are not representative of a vertical planar surface. By discarding any vectors that are not perpendicular to gravity, the electronic device removes false positives when the electronic device 100 is oriented to be pointed to, for example, a ceiling or a floor of the local environment 112 that are planar surfaces (and may also be directed towards the electronic device) but are not vertically-oriented such as to be a wall. In some embodiments, based on non-visual sensor data from the IMU, the electronic device 100 discards oriented point vectors that are not substantially perpendicular (within a pre-determined threshold or margin in a manner similar to that described with respect to block 410) to gravity. Accordingly, the electronic device 100 detects the presence of walls (e.g., a vertical planar surface aligned in the direction perpendicular to gravity) or other vertical surfaces in the local environment 112 only in response to an oriented point vector of a planar surface both facing the electronic device 100 and also being aligned in a direction substantially perpendicular (within a predetermined threshold) to gravity.

Figure 5:
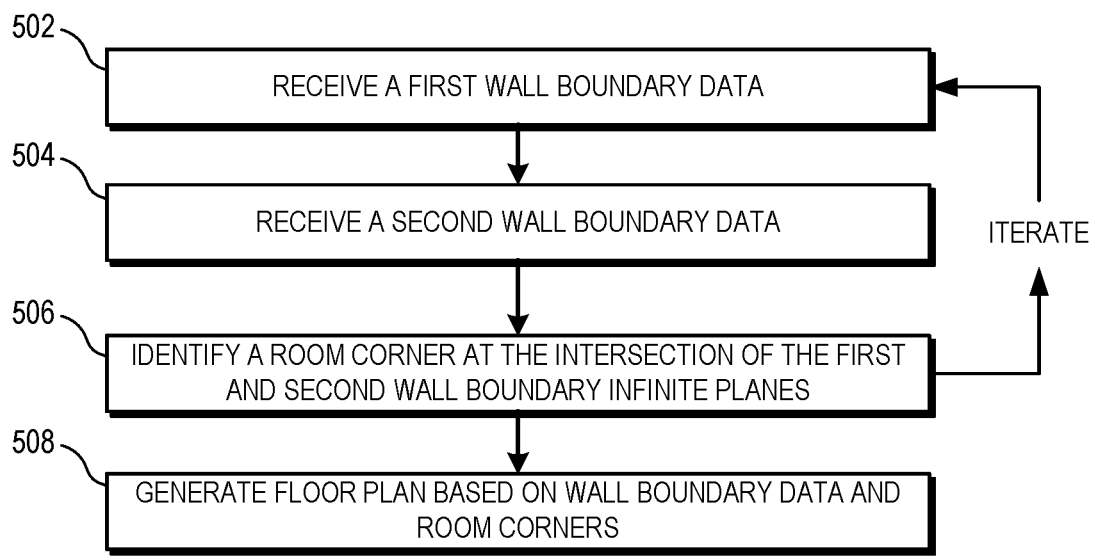
FIG. 5 illustrates a flow diagram of a method for generating a floor plan of a room at the electronic device of FIG. 1 in accordance with at least one embodiment of the present disclosure.

FIG. 5 illustrates a flow diagram of a method 500 of generating a floor plan of a room at the electronic device 100 in accordance with at least one embodiment of the present disclosure. The method 500 initiates at block 502 with the electronic device 100 receiving data representative of a first wall boundary. In some embodiments, such as described in more detail relative to FIGS. 2 and 4, the first wall boundary data includes detection of a vertical planar surface when the electronic device 100 is pointed towards a wall. In response to a user prompt (not shown) displayed to the user 100 notifying the presence of a vertical planar surface, the user 110 confirms that the detected vertical planar surface is indeed a wall and should be added to the floor plan. The first wall boundary 204 is initially represented as an infinite plane as the electronic device 100 is unaware of the metes and bounds of the first wall boundary relative to the unmapped room 202. Although described here in the context of a manual process by which the user 110 confirms that a detected vertical planar surface represents a wall boundary, those skilled in the art will recognize that in various other embodiments the electronic device 100 is capable of identifying and validating whether detected vertical planar surfaces are walls using, for example, artificial intelligence and machine learning to recognize walls without manual human intervention.

At block 504, the electronic device 100 receives data representing a second wall boundary. In some embodiments, such as described in more detail relative to FIG. 2, the second wall boundary data includes detection of a vertical planar surface when the electronic device 100 is pointed towards a wall. The electronic device 100 detects such vertical surfaces based on, for example, any distinguishable features of the wall including but not limited to light switches, paintings, curtains, TV, wall textures, and the like. In response to a user prompt (not shown) displayed to the user 100 notifying the presence of a vertical planar surface, the user 110 confirms that the detected vertical planar surface is indeed a wall and should be added to the floor plan. The second wall boundary 206 is initially represented as an infinite plane as the electronic device 100 is unaware of the metes and bounds of the second wall boundary 206 relative to the unmapped room 202.

At block 506, the electronic device 100 identifies a corner of the room based on the intersection of the infinite planes of the first wall boundary and the second wall boundary. The operations of blocks 502, 504, and 506 are iterated and performed for a plurality of walls of the room before generating a floor plan at block 508.

Figure 6:
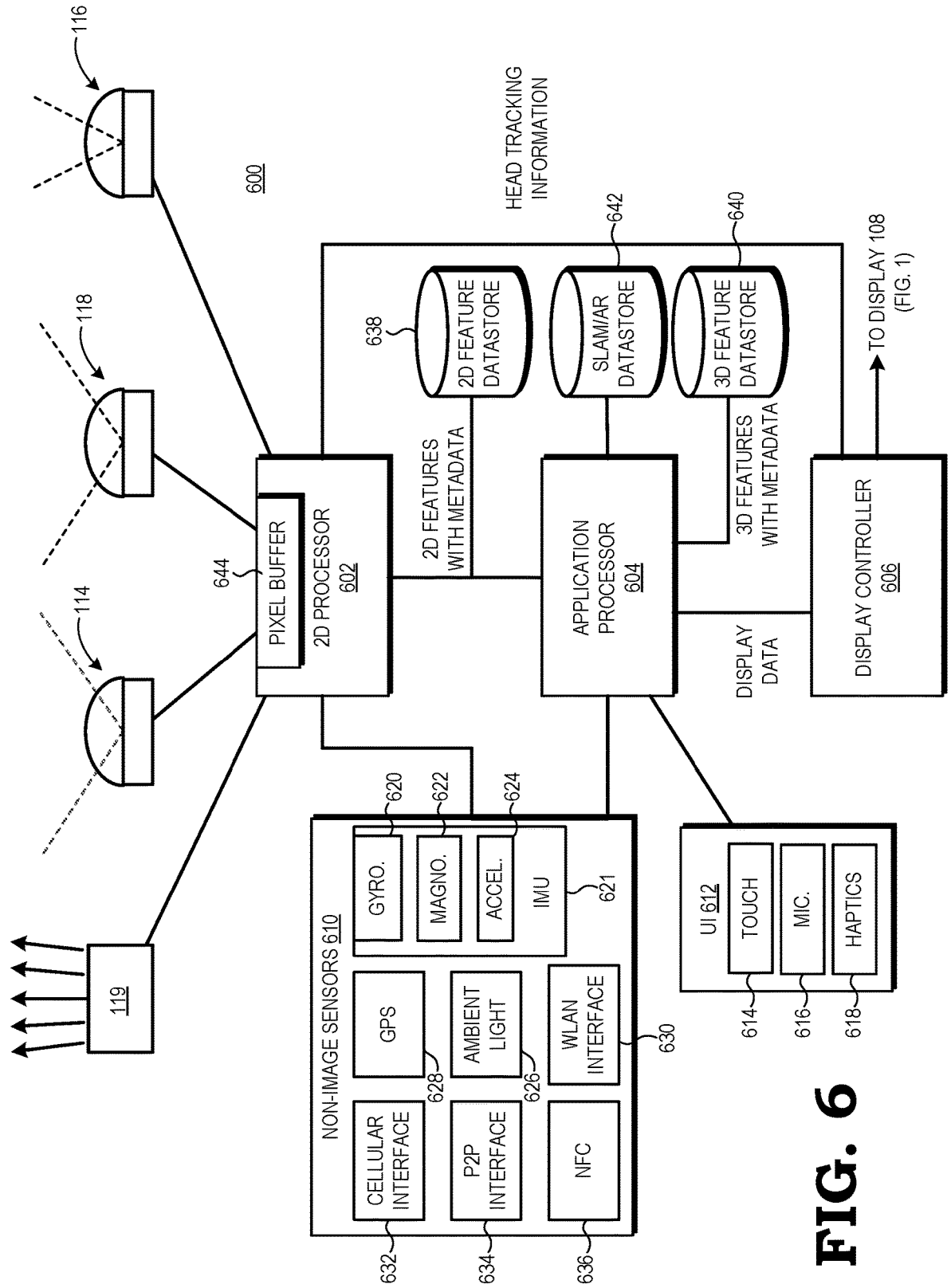
FIG. 6 is a block diagram illustrating a processing system of an electronic device in accordance with at least one embodiment of the present disclosure.

FIG. 6 illustrates an example processing system 600 implemented by the electronic device 100 in accordance with at least one embodiment of the present disclosure. The processing system 600 includes the wide-angle imaging sensor 114, the narrow-angle imaging sensor 116, the user-facing imaging sensor 118, and the depth sensor 120. The processing system 600 further includes a 2D processor 602, an application processor 604, a display controller 606, a set 610 of non-visual sensors, and a user interface 612.

The user interface 612 includes one or more components manipulated by the user to provide user input to the electronic device 100, such as a touchscreen 614, a mouse, a keyboard, a microphone 616, various buttons or switches, and various haptic actuators 618. The set 610 of non-visual sensors can include any of a variety of sensors used to provide non-visual context or state of the electronic device 100. Examples of such sensors include an IMU 621 including a gyroscope 620, a magnetometer 622, and an accelerometer 624, and an ambient light sensor 626. The non-visual sensors further can include various wireless reception or transmission based sensors, such as a GPS receiver 628, a wireless local area network (WLAN) interface 630, a cellular interface 632, a peer-to-peer (P2P) wireless interface 634, and a near field communications (NFC) interface 636.

The electronic device 100 further has access to various datastores storing information or metadata used in conjunction with its image processing, location mapping, and location-utilization processes. These datastores can include a 2D feature datastore 638 to store metadata for 2D spatial features identified from imagery captured by the imaging sensors of the electronic device 100 and a 3D spatial feature datastore 640 to store metadata for 3D spatial features identified from depth sensing for the 2D spatial features using analysis or modulated light-based depth sensing. The metadata stored for the 2D and 3D features can include, for example, timestamps for synchronization purposes, image identifiers of the images in which the spatial features were identified, identifiers of the capture device used, calibration information, and the like. This metadata further can include non-visual sensor data that was contemporaneously with the image containing the identified spatial feature, such as GPS, Wi-Fi, or other radio information, time-of-day information, weather condition information (which affects the lighting), and the like. The datastores further can include a SLAM/AR datastore 642 that stores SLAM-based information, such as mapping information for areas of the local environment 112 (FIG. 1) already explored by the electronic device 100, or AR information, such as CAD-based representations of the relative locations of objects of interest in the local environment 112. The datastores 638 and 640 can also store known feature descriptors and feature descriptors generated based on imagery captured at the electronic device 100. The datastores may be local to the electronic device 100, such as on a hard drive, solid state memory, or removable storage medium (not shown), the datastores may be remotely located and accessible via, for example, one or more of the wireless interfaces of the electronic device 100, or the datastores may be implemented as a combination of local and remote data storage.

In the depicted implementation, the processing system 600 employs two processors: the 2D processor 602 configured to efficiently identify 2D spatial features from visible-light imagery and depth sensor imagery captured by the imaging sensors of the electronic device 100; and the application processor 604 configured to efficiently identify 3D spatial features from the 2D spatial features and to efficiently provide location-based functionality, such as visual odometry or other SLAM functionality, AR functionality, and the like. However, in other embodiments, the described functionality of the 2D processor 602 and the application processor 604 may be implemented in a single processor, or more than two processors together may implement the described functionality. The 2D processor 602 can be implemented as, for example, a single-core or multiple-core graphics processing unit (GPU) and the application processor 604 can be implemented as, for example, a GPU or a single-core or multiple-core central processing unit (CPU).

The 2D processor 602 is coupled to the wide-angle imaging sensor 114, the narrow-angle imaging sensor 116, and the user-facing imaging sensor 118 so as to receive image data captured by the imaging sensors in one or more pixel row buffers 644. In one embodiment, the 2D processor 602 includes an interface and a pixel row buffer 644 for each imaging sensor so as to be able to receive image data from each imaging sensor in parallel. In another embodiment, the 2D processor 602 includes a single interface and a pixel row buffer 644 and thus the 2D processor 602 multiplexes between the imaging sensors.

The 2D processor 602 is configured to process the captured image data from the imaging sensors to identify 2D spatial features present in the image data. In some embodiments, the 2D processor 602 implements a hardware configuration specifically designed for this task. In other embodiments, the 2D processor 602 includes a more general processor architecture that provides the 2D spatial feature detection through execution of a software program configured to implement the 2D spatial feature detection process. The 2D processor 602 also may implement a combination of specialized hardware and specialized software for this purpose. As described above, any of a variety of well-known 2D spatial feature detection or extraction algorithms may be implemented by the 2D processor 602. The 2D processor 602 stores metadata and other information pertaining to the identified 2D spatial features to the 2D feature datastore 638.

The 2D processor 602, in one embodiment, is configured to analyze imagery captured by the user-facing imaging sensor 118 to track the current pose (e.g., the current location) of the user's head using any of a variety of well-known head tracking algorithms. In the depicted example, the 2D processor 602 provides the head tracking information to the display controller 606, which in turn is configured to adjust the displayed imagery to react to changes in the user's view perspective as reflected in changes in pose of the user's head. In another embodiment, the 2D processor 602 provides the head tracking information to the application processor 604, which in turn modifies the display data to reflect updated view perspectives before the display data is provided to the display controller 606.

The 2D processor 602 also acts as a controller that operates the modulated light projector 119 in its use in determining depth data for spatial features identified in the captured imagery of the local environment 112. In certain conditions, such as relatively bright settings (as sensed using the ambient light sensor 626), the 2D processor 602 may use image analysis of imagery concurrently captured by the wide-angle imaging sensor 114 and the narrow-angle imaging sensor 116 to determine depth data for spatial features present in the captured imagery. In other conditions, such as relatively low lighting conditions, the 2D processor 602 may switch to the use of the depth sensor 120 (FIG. 1) to determine this depth data. In other embodiments, the processing system 600 implements a controller (not shown) separate from the 2D processor 602 to control the operation of the modulated light projector 119.

As described above, the depth sensor 120 relies on the projection of a modulated light pattern by the modulated light projector 119 into the local environment and on the capture of the reflection of the modulated light pattern therefrom by one or more of the imaging sensors. Thus, the 2D processor 602 may use one or both of the forward-facing imaging sensors 114 and 116 to capture the reflection of a projection of the modulated light pattern and process the resulting imagery of the reflected modulated light pattern to determine the depths of corresponding spatial features represented in the reflected modulated light pattern. To match a depth reading with a corresponding 2D spatial feature, the 2D processor 602 can perform a 2D spatial feature analysis on the depth imagery to determine a 2D spatial feature and its relative depth, and then attempt to match the 2D spatial feature to a corresponding spatial feature identified in the visual-light imagery captured at or near the same time as the reflected modulated light imagery was captured. In another embodiment, the 2D processor 602 can capture a visible-light image, and quickly thereafter control the modulated light projector 119 to project a modulated light pattern and capture a reflected modulated light image. The 2D processor 602 then can develop a depth map for the visible-light image from the reflected modulated light image as they effectively represent the same scene with the same spatial features at the same coordinates due to the contemporaneous capture of the visible-light image and the reflected modulated light image.

The application processor 604 is configured to implement a feature identification module to identify feature points represented in the captured imagery using the 2D spatial features represented in the 2D feature datastore 638 and using non-visual sensor information from the set 610 of non-visual sensors. As with the 2D processor 602, the application processor 604 may be configured to perform this process through a specialized hardware configuration, through execution of software configured for this process, or a combination of specialized hardware and software. Metadata and other information for the identified 3D spatial features are stored in the 3D feature datastore 640. In at least one embodiment, the application processor 604 implements (e.g., executes instructions that, when executed, manipulate the application processor 604 to perform the operations of) the planar surface detection operations described herein. Thus, the application processor 604 can identify characteristics of the identified features and discern walls (e.g., vertical planar surfaces) from other planar surfaces based on these characteristics as described above.

The application processor 604 further is configured to provide SLAM, AR, VR, and other location-based functionality using 3D spatial features represented in the 3D feature datastore 640 and using the current context of the electronic device 100 as represented by non-visual sensor data. The current context can include explicit or implicit user input obtained from, for example, the user interface 612 or via an analysis of user interactions. Similarly, the application processor 604 can use a history of positions/orientations of the electronic device 100 and a history of spatial features observed in those positions/orientations to create a map of the local environment 112 based on the localization data.

The location-based functionality provided by the application processor 604 further can include AR-related or VR-related functionality that includes identifying and accessing from the SLAM/AR datastore 642 graphical information to be provided as a graphical overlay on the display 108 based on the current pose determined by the application processor 604. This graphical overlay can be provided in association with imagery captured by the imaging sensors in the current pose for display at the display 108 via the display controller 606. The display controller 606 operates to control the display 108 (FIG. 1) to display imagery represented by display data received from the application processor 604. Further, in some embodiments, the display controller 606 can receive head tracking information from the 2D processor 602 and adjust the view perspective of the imagery being displayed based on the user head position or eye position represented in the received head tracking information.

Much of the inventive functionality and many of the inventive principles described above are well suited for implementation with or in software programs or instructions and integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In the following some examples are described.

Example 1: A method, comprising:
identifying, at an electronic device, a plurality of feature points of an environment proximate the electronic device based on imagery captured at the electronic device and based on received non-visual pose information obtained from non-visual sensors;
identifying one or more planar surfaces based on the plurality of feature points;
computing, at the electronic device, a plurality of oriented point vectors associated with the one or more planar surfaces; and
detecting a vertical planar surface within the one or more planar surfaces based at least in part on one or more of the plurality of oriented point vectors being aligned in a direction perpendicular to gravity within a predetermined threshold.

Example 2: The method of example 1, wherein the plurality of feature points includes one or more features identifiable in imagery captured at the electronic device.

Example 3: The method of example 1 or 2, wherein computing the plurality of oriented point vectors comprises:
determining, at the electronic device, a surface normal for each of the identified plurality of feature points.

Example 4: The method of at least one of the preceding examples, further comprising:
discarding a subset of the plurality of oriented point vectors, where the subset of the plurality of oriented point vectors are not directed towards the electronic device within a first predetermined threshold.

Example 5: The method of at least one of the preceding examples, further comprising:
discarding a subset of the plurality of oriented point vectors, where the subset of the plurality of oriented point vectors are not aligned in the direction perpendicular to gravity.

Example 6: The method of at least one of the preceding examples, further comprising:
generating a floor plan of the environment proximate the electronic device based on one or more of the plurality of oriented point vectors corresponding to vertical planar surfaces.

Example 7: The method of example 6, wherein generating the floor plan of the environment comprises:
receiving, at the electronic device, a first infinite plane corresponding to a first wall boundary identified as a first vertical planar surface;
receiving, at the electronic device, a second infinite plane corresponding to a second wall boundary identified as a second vertical planar surface; and
identifying a room corner at an intersection of the first infinite plane and the second infinite plane.

Example 8: The method of at least one of the preceding examples, wherein a plurality of visually distinct features points are detected by performing raycasting.

Example 9: An electronic device, comprising:
an imaging camera to capture imagery of an environment proximate the electronic device;
a processor to:
identify a plurality of feature points of the environment based on imagery captured by the imaging camera and further based on received non-visual pose information obtained from non-visual sensors;
identify one or more planar surfaces based on the plurality of feature points;
compute a plurality of oriented point vectors associated with the one or more planar surfaces; and
detect a vertical planar surface within the one or more planar surfaces based at least in part on one or more of the plurality of oriented point vectors being aligned in a direction perpendicular to gravity within a predetermined threshold.

Example 10: The electronic device of example 9, wherein the plurality of feature points includes one or more features identifiable in imagery captured at the electronic device.

Example 11: The electronic device of example 9 or 10, further comprising an inertial measurement unit for determining a gravity direction.

Example 12: The electronic device of at least one of the examples 9 to 11, wherein the processor is to compute the plurality of oriented point vectors by:
determining, at the electronic device, a surface normal for each of the identified plurality of feature points.

Example 13: The electronic device of at least one of the examples 9 to 12, wherein the processor is to compute the plurality of oriented point vectors by:
discarding a subset of the plurality of oriented point vectors, where the subset of the plurality of oriented point vectors are not directed towards the electronic device within a first predetermined threshold.

Example 14: The electronic device of at least one of the examples 9 to 13, wherein the processor is to compute the plurality of oriented point vectors by:
discarding subset of the plurality of oriented point vectors, where the subset of the plurality of oriented point vectors are not aligned in the direction perpendicular to gravity.

Example 15: The electronic device of at least one of the examples 9 to 14, wherein the processor is further to:
generate a floor plan of the environment proximate the electronic device based on one or more of the plurality of oriented point vectors corresponding to vertical planar surfaces.

Example 16: The electronic device of example 15, wherein the processor is to generate the floor plan by:

receiving a first infinite plane corresponding to a first wall boundary identified as a first vertical planar surface;

receiving a second infinite plane corresponding to a second wall boundary identified as a second vertical planar surface; and identifying a room corner at an intersection of the first infinite plane and the second infinite plane.

Example 17: A method, comprising:

identifying, at an electronic device, a plurality of feature points of an environment proximate the electronic device based on imagery captured at the electronic device and based on received non-visual pose information obtained from non-visual sensors;

computing, at the electronic device, a plurality of oriented point vectors associated with one or more planar surfaces;

detecting a vertical planar surface within the one or more planar surfaces based at least in part on one or more of the plurality of oriented point vectors being aligned in a direction perpendicular to gravity within a predetermined threshold; and displaying, at a display of the electronic device, a user prompt requesting confirmation that the detected vertical planar surface corresponds to a wall position to be added to a floor plan.

Example 18: The method of example 17, further comprising:

receiving a first infinite plane corresponding to a first wall boundary identified as a first vertical planar surface;

receiving a second infinite plane corresponding to a second wall boundary identified as a second vertical planar surface; and identifying a room corner at an intersection of the first infinite plane and the second infinite plane.

Example 19: The method of example 17 or 18, further comprising:

determining, based on non-visual pose information including Global Positioning System (GPS) data captured at the electronic device, that a path of the electronic device crosses the first wall boundary; and adding a doorway to the floor plan at the position where the path of the electronic device crosses the first wall boundary.

Example 20: The method of at least one of the examples 17 to 19, further comprising:

generating the floor plan of the environment proximate the electronic device based on one or more of the plurality of oriented point vectors corresponding to vertical planar surfaces.

Example 21: The method of at least one of the examples 17 to 20, further comprising:

discarding a subset of the plurality of oriented point vectors, where the subset of the plurality of oriented point vectors are not aligned in the direction perpendicular to gravity.

Example 22: The method of at least one of the examples 17 to 21, wherein a plurality of visually distinct features points are detected by performing raycasting.

What is claimed is:

1. A method, comprising:

identifying, at an electronic device by performing raycasting, a plurality of feature points of an environment proximate the electronic device based on imagery captured at the electronic device and based on received non-visual pose information obtained from non-visual sensors, the raycasting projecting rays into the electronic device's view of the environment and returning feature points that the rays intersect, along with the pose of that intersection in world space, to determine whether a perceived plane passes through the feature points at the intersection of the rays, the raycasting resolving whether a ray along the normal from a screen of the electronic device returns a planar surface;

identifying one or more planar surfaces based on the plurality of feature points;

computing, at the electronic device, a plurality of oriented point vectors associated with the one or more planar surfaces, comprising determining a surface normal to each of the identified plurality of feature points;

detecting a vertical planar surface within the one or more planar surfaces based at least in part on one or more of the plurality of oriented point vectors being aligned in a direction perpendicular to gravity within a predetermined threshold; and generating a floor plan of the environment proximate the electronic device based on one or more of the plurality of oriented point vectors corresponding to vertical planar surfaces.

2. The method of claim 1, wherein the plurality of feature points includes one or more features identifiable in imagery captured at the electronic device.

3. The method of claim 1, wherein computing the plurality of oriented point vectors comprises:

determining, at the electronic device, a surface normal for each of the identified plurality of feature points.

4. The method of claim 1, further comprising:

discarding a subset of the plurality of oriented point vectors, where the subset of the plurality of oriented point vectors are not directed towards the electronic device within a first predetermined threshold.

5. The method of claim 1, further comprising:

discarding a subset of the plurality of oriented point vectors, where the subset of the plurality of oriented point vectors are not aligned in the direction perpendicular to gravity.

6. The method of claim 1, wherein generating the floor plan of the environment comprises:

receiving, at the electronic device, a first infinite plane corresponding to a first wall boundary identified as a first vertical planar surface;

receiving, at the electronic device, a second infinite plane corresponding to a second wall boundary identified as a second vertical planar surface; and identifying a room corner at an intersection of the first infinite plane and the second infinite plane.

7. An electronic device, comprising:

an imaging camera to capture imagery of an environment proximate the electronic device;

a processor to:

identify a plurality of feature points of the environment by performing raycasting based on imagery captured by the imaging camera and further based on received non-visual pose information obtained from non-visual sensors), the raycasting projecting a ray into the electronic device's view of the environment and returning feature points that the ray intersects, along with the pose of that intersection in world space, to determine whether a perceived plane passes through the feature points at the intersection of the ray, the raycasting resolving whether a ray along the normal from a screen of the electronic device returns a planar surface;

identify one or more planar surfaces based on the plurality of feature points;

compute a plurality of oriented point vectors associated with the one or more planar surfaces, comprising determining a surface normal to each of the identified plurality of feature points;

detect a vertical planar surface within the one or more planar surfaces based at least in part on one or more of the plurality of oriented point vectors being aligned in a direction perpendicular to gravity within a predetermined threshold; and generate a floor plan of the environment proximate the electronic device based on one or more of the plurality of oriented point vectors corresponding to vertical planar surfaces.

8. The electronic device of claim 7, wherein the plurality of feature points includes one or more features identifiable in imagery captured at the electronic device.

9. The electronic device of claim 7, further comprising an inertial measurement unit for determining a gravity direction.

10. The electronic device of claim 7, wherein the processor is to compute the plurality of oriented point vectors by:
determining, at the electronic device, a surface normal for each of the identified plurality of feature points.

11. The electronic device of claim 7, wherein the processor is to compute the plurality of oriented point vectors by:
discarding a subset of the plurality of oriented point vectors, where the subset of the plurality of oriented point vectors are not directed towards the electronic device within a first predetermined threshold.

12. The electronic device of claim 7, wherein the processor is to compute the plurality of oriented point vectors by:
discarding a subset of the plurality of oriented point vectors, where the subset of the plurality of oriented point vectors are not aligned in the direction perpendicular to gravity.

13. The electronic device of claim 7, wherein the processor is to generate the floor plan by:
receiving a first infinite plane corresponding to a first wall boundary identified as a first vertical planar surface;
receiving a second infinite plane corresponding to a second wall boundary identified as a second vertical planar surface; and
identifying a room corner at an intersection of the first infinite plane and the second infinite plane.

14. A method, comprising:
identifying, at an electronic device by performing raycasting, a plurality of feature points of an environment proximate the electronic device based on imagery captured at the electronic device and based on received non-visual pose information obtained from non-visual sensors, the raycasting projecting rays into the electronic device's view of the environment and returning feature points that the rays intersect, along with the pose of that intersection in world space, to determine whether a perceived plane passes through the feature points at the intersection of the rays, the raycasting resolving whether a ray along the normal from a screen of the electronic device returns a planar surface;

computing, at the electronic device, a plurality of oriented point vectors associated with one or more planar surfaces, comprising determining a surface normal to each of the identified plurality of feature points;

detecting a vertical planar surface within the one or more planar surfaces based at least in part on one or more of the plurality of oriented point vectors being aligned in a direction perpendicular to gravity within a predetermined threshold;

displaying, at a display of the electronic device, a user prompt requesting confirmation that the detected vertical planar surface corresponds to a wall position to be added to a floor plan; and in response to receiving a user confirmation, adding a wall to the floor plan at the wall position.

15. The method of claim 14, further comprising:
receiving a first infinite plane corresponding to a first wall boundary identified as a first vertical planar surface;
receiving a second infinite plane corresponding to a second wall boundary identified as a second vertical planar surface; and
identifying a room corner at an intersection of the first infinite plane and the second infinite plane.

16. The method of claim 15, further comprising:
determining, based on non-visual pose information including Global Positioning System (GPS) data captured at the electronic device, that a path of the electronic device crosses the first wall boundary; and
adding a doorway to the floor plan at the position where the path of the electronic device crosses the first wall boundary.

17. The method of claim 14, further comprising:
generating the floor plan of an environment proximate the electronic device based on one or more of the plurality of oriented point vectors corresponding to vertical planar surfaces.

18. The method of claim 14, further comprising:
discarding a subset of the plurality of oriented point vectors, where the subset of the plurality of oriented point vectors are not aligned in the direction perpendicular to gravity.

* * * * *